(12) United States Patent
Wu et al.

(10) Patent No.: US 12,732,864 B2
(45) Date of Patent: Sep. 8, 2026

(54) COORDINATED LOAD BALANCING IN MOBILE EDGE COMPUTING NETWORK

(71) Applicant: SAMSUNG ELECTRONICS CO., LTD., Suwon-si (KR)

(72) Inventors: Di Wu, Saint-Laurent (CA); Manyou Ma, Vancouver (CA); Yi Tian Xu, Mount Royal (CA); Jimmy Li, Longueuil (CA); Seowoo Jang, Seoul (KR); Xue Liu, Montreal (CA); Gregory Lewis Dudek, West Mount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 878 days.

(21) Appl. No.: 17/965,294

(22) Filed: Oct. 13, 2022

(65) Prior Publication Data

US 2023/0156520 A1 May 18, 2023

Related U.S. Application Data

(60) Provisional application No. 63/278,984, filed on Nov. 12, 2021.

(51) Int. Cl.
*H04W 28/08* (2023.01)
*H04W 28/02* (2009.01)

(52) U.S. Cl.
CPC ... *H04W 28/0925* (2020.05); *H04W 28/0226* (2013.01)

(58) Field of Classification Search
CPC ......... H04W 28/0925; H04W 28/0226; H04W 36/00–385
See application file for complete search history.

(56) References Cited

U.S. PATENT DOCUMENTS

| | | | | |
|---|---|---|---|---|
| 5,950,134 | A * | 9/1999 | Agrawal | H04W 36/322 455/439 |
| 10,440,096 | B2 | 10/2019 | Sabella et al. | |
| 10,846,594 | B2 * | 11/2020 | Choque | H04L 9/0643 |
| 11,558,276 | B2 * | 1/2023 | Sivaraj | H04L 43/0852 |

(Continued)

FOREIGN PATENT DOCUMENTS

| | | | | |
|---|---|---|---|---|
| EP | 3869847 A1 * | 8/2021 | | H04W 16/02 |
| WO | WO-2013091341 A1 * | 6/2013 | | H04W 28/0861 |

(Continued)

*Primary Examiner* — Mehmood B. Khan
(74) *Attorney, Agent, or Firm* — Sughrue Mion, PLLC

(57) ABSTRACT

A method includes obtaining at least one policy parameter of a neural network corresponding to a load balancing policy, receiving trajectories for each mobile device in a plurality of mobile devices of the wireless network, each trajectory corresponding to a sequence of states of a respective mobile device, wherein the sequence of states is generated based on a continuous interaction of an existing policy of the respective mobile device with the wireless network, estimating advantage functions for each mobile device in the plurality of mobile devices based on the trajectories for each respective mobile device, and updating the at least one policy parameter based on the estimated advantage functions such that the load balancing policy is determined based on states of each mobile device in the plurality of mobile devices.

15 Claims, 8 Drawing Sheets

(56) References Cited

U.S. PATENT DOCUMENTS

| | | | | |
|---|---|---|---|---|
| 11,703,853 | B2 * | 7/2023 | Hong | G08G 5/26<br>701/3 |
| 2003/0017831 | A1 * | 1/2003 | Lee | H04W 8/04<br>455/436 |
| 2006/0268783 | A1 * | 11/2006 | Julian | H04W 36/18<br>370/331 |
| 2012/0236712 | A1 * | 9/2012 | Park | H04W 36/22<br>370/230 |
| 2013/0343281 | A1 * | 12/2013 | Bakker | H04L 67/10<br>370/328 |
| 2015/0156122 | A1 * | 6/2015 | Singh | H04L 61/5084<br>370/235 |
| 2017/0086121 | A1 * | 3/2017 | Kaushik | H04B 17/318 |
| 2019/0138934 | A1 * | 5/2019 | Prakash | G06N 20/00 |
| 2021/0117249 | A1 * | 4/2021 | Doshi | G06F 9/5077 |
| 2021/0282222 | A1 * | 9/2021 | Kapoor | H04W 52/0225 |
| 2022/0116811 | A1 * | 4/2022 | Li | H04W 24/10 |
| 2022/0167236 | A1 * | 5/2022 | Melodia | H04W 28/0967 |
| 2022/0400532 | A1 * | 12/2022 | Kalkunte | H04W 72/21 |
| 2023/0068386 | A1 * | 3/2023 | Akdeniz | G06N 3/084 |
| 2024/0064105 | A1 * | 2/2024 | Sharma | H04L 47/24 |
| 2024/0306049 | A1 * | 9/2024 | Yan | G06N 3/09 |

FOREIGN PATENT DOCUMENTS

| | | | | | |
|---|---|---|---|---|---|
| WO | WO-2024256902 | A1 * | 12/2024 | | H04W 24/02 |
| WO | WO-2025099302 | A1 * | 5/2025 | | B60W 40/09 |

* cited by examiner 402
404
406
Other Tasks (O.T.)
O.T.
Task1
Task*1
Task2
t0
t1
t2
(a) t = t0
(b) t = t1
(c) t = t2

COORDINATED LOAD BALANCING IN MOBILE EDGE COMPUTING NETWORK

CROSS-REFERENCE RELATED APPLICATION(S)

This application is based on and claims priority under 35 U.S.C. § 119 to U.S. Provisional Application No. 63/278,984, filed on Nov. 12, 2021, the disclosure of which is incorporated herein by reference in its entirety.

BACKGROUND

1. Field

The disclosure relates generally to systems and methods for load balancing in a mobile network.

2. Description of Related Art

Mobile/wireless network computing, such as mobile edge computing (MEC) has been proposed as one of the key enabling technologies for the fifth generation (5G) and beyond communications networks. Under the MEC framework, Internet of Things (IoT) devices with limited communication, computing, and caching (3C) capabilities are deployed to perform various tasks with stringent quality of services (QoS) requirements such as latency and throughput. To this end, edge servers with 3C capabilities (e.g., small cell base stations with local central processing units (CPUs), fronthaul connection, and file storage systems, etc.) have been deployed for the IoT devices to offload tasks and fetch popular contents. Due to the physical separation of the resources and the coupling between the 3C components for each task, the efficient coordination and resource allocation is crucial for efficient resource utilization and satisfactory system performance of 3C-enabled MEC systems.

SUMMARY

According to an aspect of the disclosure, a method may include obtaining at least one policy parameter of a neural network corresponding to a load balancing policy, receiving trajectories for each mobile device in a plurality of mobile devices of the wireless network, each trajectory corresponding to a sequence of states of a respective mobile device, wherein the sequence of states is generated based on a continuous interaction of an existing policy of the respective mobile device with the wireless network, estimating advantage functions for each mobile device in the plurality of mobile devices based on the trajectories for each respective mobile device, and updating the at least one policy parameter based on the estimated advantage functions such that the load balancing policy is determined based on states of each mobile device in the plurality of mobile devices.

According to an aspect of the disclosure, a system may include a memory storing instructions, and a processor configured to execute the instructions to obtain at least one policy parameter of a neural network corresponding to a load balancing policy, receive trajectories for each mobile device in a plurality of mobile devices of a mobile edge computing (MEC) network, each trajectory corresponding to a sequence of states of a respective mobile device, estimate advantage functions for each mobile device in the plurality of mobile devices based on the trajectories for each respective mobile device, and update the at least one policy parameter based on the estimated advantage functions such that the load balancing policy is determined based on states of each mobile device in the plurality of mobile devices.

According to an aspect of the disclosure, a non-transitory computer-readable storage medium may store instructions that, when executed, cause at least one processor to obtain at least one policy parameter of a neural network corresponding to a load balancing policy, receive trajectories for each mobile device in a plurality of mobile devices of a mobile edge computing (MEC) network, each trajectory corresponding to a sequence of states of a respective mobile device, estimate advantage functions for each mobile device in the plurality of mobile devices based on the trajectories for each respective mobile device, and update the at least one policy parameter based on the estimated advantage functions such that the load balancing policy is determined based on states of each mobile device in the plurality of mobile devices.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
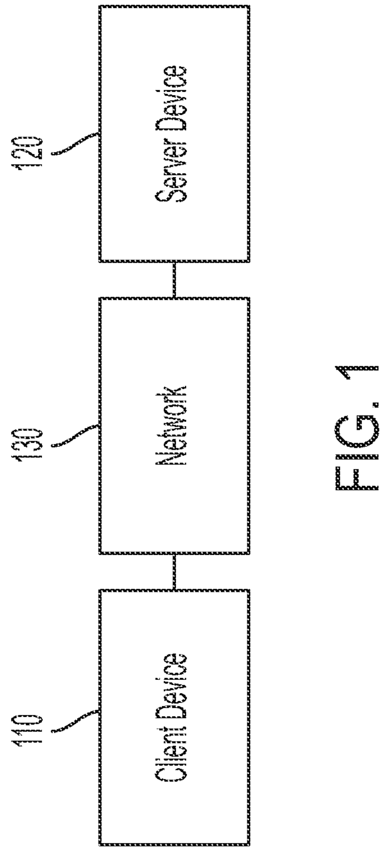
FIG. 1 is a diagram of devices of a system according to an embodiment.

FIG. 1 is a diagram of a system according to an embodiment. FIG. 1 includes a client device 110, a server device 120, and a network 130. The client device 110 and the server device 120 may interconnect via through the network 130 providing wired connections, wireless connections, or a combination of wired and wireless connections.

The client device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
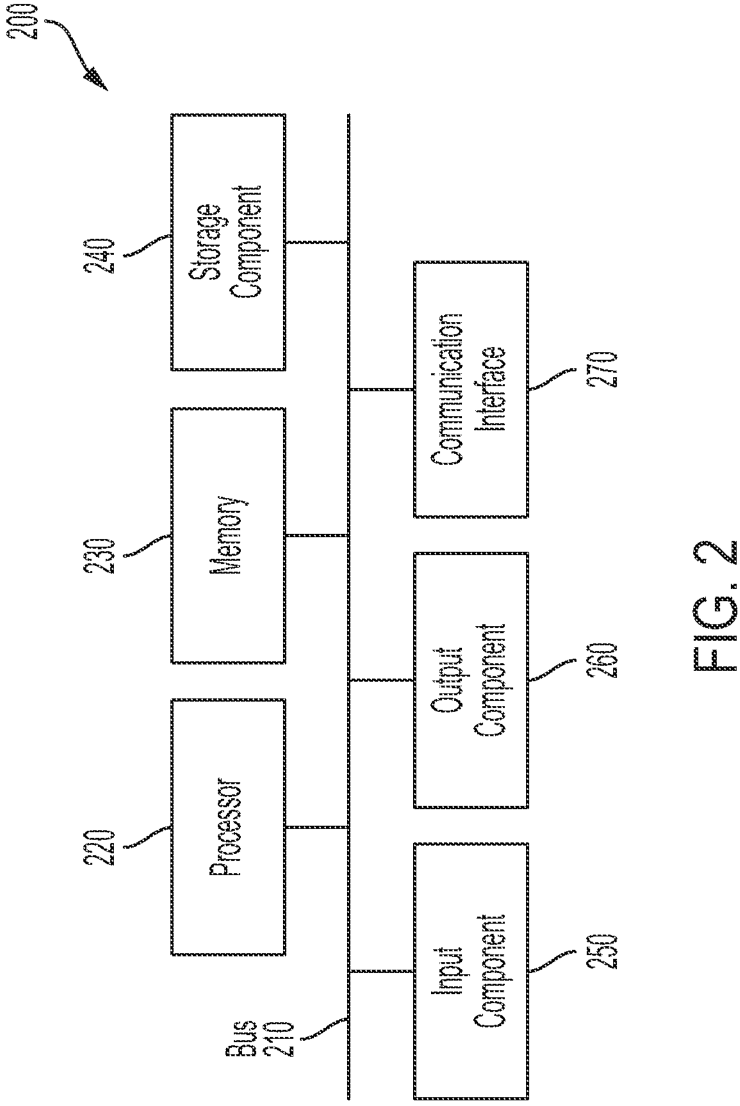
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the client device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

In some multi-cell mobile wireless networks, mobility load balancing (MLB) algorithms are designed to evenly distribute user traffic across base stations. In MLB, the traffic load may be controlled by a parameter called cell individual offset (CIO), which make users handover decisions based on the relative magnitude of their channel state information (CSI) and CIO with respect to two neighboring cells (i.e., identifying A3 events). Some approaches focus on rule-based methods for MLB, while other approaches use deep reinforcement learning (DRL)-based MLB methods. Hierarchical and transfer learning based DRL methods for MLB shows improved performance in terms of traffic throughput and load variation reduction.

Provided are systems, methods and devices (herein described with reference to a system) that apply DRL to the load balancing problem in communication, computing, and caching (3C)-enabled mobile networks, such as mobile edge computing (MEC) networks. For example, in a virtual reality (VR)-based application, VR users may submit computational tasks, such as video processing, or content downloading tasks, such as movie streaming, to an MEC network. The CPUs, fronthaul links, and wireless links in the MEC network work in concert to handle the computational, fronthaul, and transmission loads in the network. The system may minimize number of backlogged jobs in the most overloaded base station, and thereby to reduce the average end-to-end delay experienced by users in the network. In addition to CSI, the user association decision may also depend on the caching and computational requirements of each user, making solely CIO-based algorithms restrictive. Provided are embodiments of a DRL-based algorithm that directly assigns the associated edge nodes for all users.

Also, provided is a method of load balancing in a wireless network. The method may include obtaining at least one policy parameter of a neural network corresponding to a load balancing policy, receiving trajectories for each mobile device in a plurality of mobile devices of the wireless network, each trajectory corresponding to a sequence of states of a respective mobile device, estimating advantage functions for each mobile device in the plurality of mobile devices based on the trajectories for each respective mobile device, and updating the at least one policy parameter based on the estimated advantage functions such that the load balancing policy is determined based on states of each mobile device in the plurality of mobile devices.

The system may adopt a multi-agent DRL-based (MARL) training approach. Separate policy networks may be used to determine a base station association decision for each user request based on the 3C load components of the request and joint load status in the network. In some embodiments, the system may adopt a parameter sharing-based scheme during training. The disclosed DRL-based load balancing algorithm may effectively reduce the load in the most overloaded base station in the network, as well as reduce the end-to-end delay in the system compared to heuristics and MLB-based algorithms.

Figure 3A:
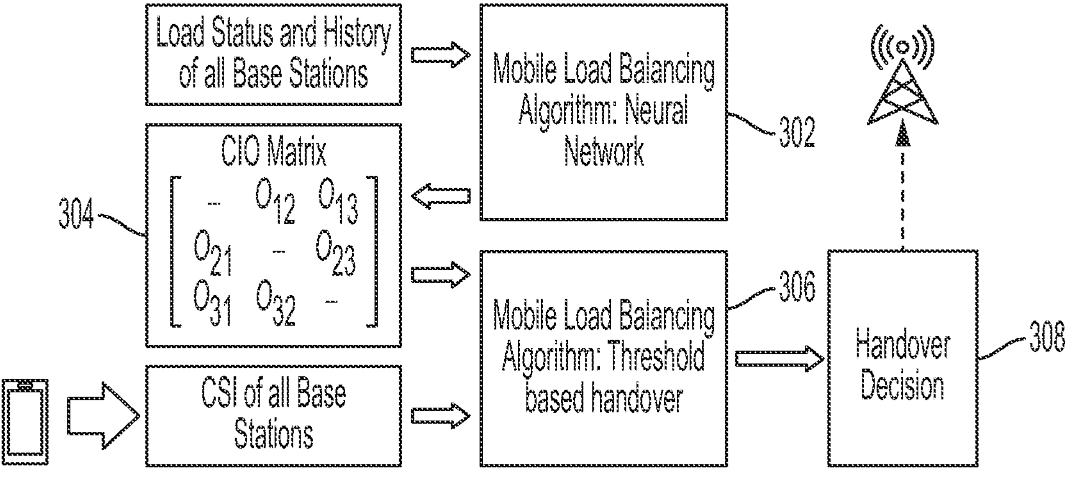
FIG. 3A is a diagram of a process for cell individual offset (CIO)-based mobility load balancing (MLB), according to related art.

FIG. 3A is a diagram of a process for CIO-based MLB, according to related art. In operation 302, the system may receive the load status and history of all base stations in the network, and may generate, with a neural network, CIO data to be output to the CIO matrix 304. In operation 306, the system may generate handover decision based on a threshold. For example, the system may receive the CSI of all the base stations, as well as the CIO matrix, to generate a handover decision 308.

Figure 3B:
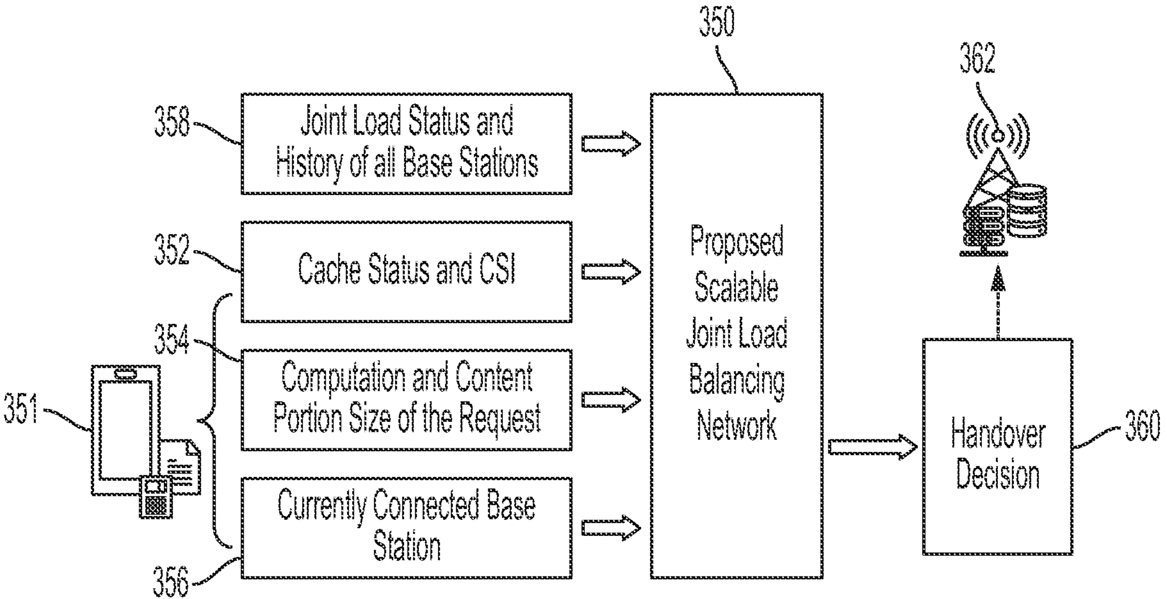
FIG. 3B is a diagram of a process for joint load balancing, according to an embodiment.

FIG. 3B is a diagram of a process for joint load balancing, according to an embodiment. The system may include a scalable joint load balancing network 350 that receives, as inputs, a cache status and CSI 352 for a user device 351, a computation and content portion size of a data request 354 from the user device 351, currently connected base station information 356 for a base station to which the user device 351 is connected, as well as a joint load status and history of all base stations 358 to generate a handover decision 360. Based on the system determining to perform a handover for the user device 351, the user device may be connected to base station 362 (e.g., from a previously connected base station).

Example embodiments may implement a time-slotted system with a set of T time slots, denoted by set T={0, 1, 2, . . . T}, where each time slot lasts for a duration of $T_{slot}$, which corresponds to multiple transmission time intervals in a standardized wireless network. User association decisions may be made at the beginning of each time slot. In an example embodiment, the downlink transmission in an MEC network includes one macro base station (MBS) and N edge nodes, which may be small cell base stations equipped with local cache and CPUs. As described herein, the set N={1, . . . , N} denotes the set of edge servers and the set M={MBS}∪N denotes the set of all the base stations. The system may be implemented in an ultra-dense network scenario, where a set of K active MEC users, denoted by K={1, . . . , K}, may be served by the MBS or any of the edge nodes in the MEC network. Efficient frequency reuse may be deployed, hence the inter-cell interference may be limited.

The channel model may be defined based on vector $$h_k(t) = \left(h_k^1(t), \ldots, h_k^M(t)\right),$$

where $$h_k^m(t) \in \mathbb{R}^+$$

denotes the channel gain between user k the base station m at time slot t, m∈M, k∈K, t∈T. Given the fixed transmission power $P_n$, the received noise power $\sigma_{m,k}$, and system bandwidth W, the expected transmission rate between base station m and user k may be expressed as in Equation (1).

$$f_{m,k}^{tran}(t) = W\log_2\left(1 + \frac{|h_k^m(t)|^2 P_n}{\sigma_{m,k}^2}\right), \forall\, m, k, t. \tag{1}$$

The noise power $\sigma_{m,k}$ may be fixed and the channel gain $$h_k^m(t)$$

may follow a random process, with the probability distribution $$P(h_k^m(t)).$$

As described below, although the system may assume various distributions made on some variables, these variables are not limited to these distributions, and the variables may be replaced with a real observable value from the network when such a value is available. The user request model may be defined based on a random variable $$r_k^{stat}(t) \in \{0, 1, 2\}$$

denoting the request status from user k at time slot t∈T. At time slot t, $$r_k^{stat}(t) = 1$$

denotes the case where user k requests for a file downloading task, $$r_k^{stat}(t) = 2$$

denotes the case where user k requests for computational task, and $$r_k^{stat}(t)=0$$

denotes the case where user k does not have any request. The system may assume that $$r_k^{stat}(t)$$

follows a stochastic process, with the probability distribution, as in Equation (2):

$$P(r_k^{stat}(t))=\lambda^{file}I(r_k^{stat}(t)=1)+\lambda^{comp}I(r_k^{stat}(t)=2),\ \forall\, k,\, t, \tag{2}$$

where I(·) stands for the indicator function, and $\lambda^{file}$ and $\lambda^{comp}$ denote the task arrival rates file downloading tasks and computational tasks.

A random vector $$r_{k^{sz}}(t)=\left(r_k^{file}(t),\, r_k^{comp}(t)\right)$$

may be denoted the size of the request made by user k∈K at time slot t∈T. For a file downloading task, $$r_k^{file}(t)$$

denotes the size of the requested file, while for a computational task, $$r_k^{file}(t)$$

denotes the size of the solution to the computational task. Furthermore, $$r_k^{comp}(t)$$

denotes the number CPU cycles required for completing the computational task. The system may assume $r_{k^{sz}}(t)$ follows a random process, with probability distribution, as in Equation (3).

$$P\left(r_k^{file}(t)\,\middle|\,r_k^{stat}(t)\right)=\frac{I\left(r_k^{file}(t)\in\left[r_{min}^{file},\, r_{max}^{file}\right]\right)I(r_k^{stat}(t)=1)}{r_{max}^{file}-r_{min}^{file}}+\frac{I\left(r_k^{file}(t)\in\left[r_{min}^{sol},\, r_{max}^{sol}\right]\right)I(r_k^{stat}(t)=2)}{r_{max}^{sol}-r_{min}^{sol}}, \tag{3}$$

$$P(r_k^{comp}(t)\mid r_k^{stat}(t))=\frac{I(r_k^{comp}(t)\in[r_{min}^{comp},\, r_{max}^{comp}])I(r_k^{stat}(t)=2)}{r_{max}^{comp}-r_{min}^{comp}}.$$

That is, $$r_k^{file}(t) \text{ and } r_k^{comp}(t)$$

follow a uniform distribution within bounds defined by $$r_{min}^{file},\ r_{max}^{file},\ r_{min}^{sol},\ r_{max}^{sol},\ r_{min}^{comp},\text{ and } r_{max}^{comp}.$$

For the user association decision, at time slot t∈T, each active user $$k\in K_{active}=\{k\in\mathcal{K}\mid r_k^{stat}(t)>0\}$$

needs to be served by one of the base stations m∈M. Thus, $u_k(t)$∈M may denote the user association decision for k∈K at time slot t∈T.

For the MBS and edge node model, the MBS may be connected to the cloud via high-speed fibre connection and may fetch contents requested by the users. Each edge server may be equipped with a local storage having finite capacity, where a subset of the contents that might be requested by users is being cached beforehand. A microwave fronthaul between the edge nodes and the MBS may be used to fetch requested files that are not being cached in the edge nodes.

$$f_{FH}^n$$

denotes the fronthaul capacity, in terms of transmission rate, of edge node n∈N.

$$f_{comp}^n$$

denotes the computing capacity of base station n, in terms of CPU cycle per time slot, n∈N. To accommodate bursty traffic and overloaded system scenarios, buffers may be installed in the base stations, where incoming tasks for the fronthaul, CPU, and wireless channel are first placed in the fronthaul queue, CPU queue, and transmission queue, respectively, and later being executed in order.

For the cache model, at time slot t∈T, the system may use a binary cache status vector $$\delta_k(t)=\left(\delta_k^{MBS}(t),\, \delta_k^1(t),\, \ldots\, ,\, \delta_k^N(t)\right)$$

to indicate whether the content requested by user k is cached in the edge nodes, where $$\delta_k^m(t)=1$$

when content requested by user k is being cached in base station m, and $$\delta_k^m(t)=0$$

denotes the case otherwise, $k \in K$, $m \in M$, and $t \in T$. The system may assume that $\delta_k(t)$ follows a stochastic process, with a distribution, as in Equation (4);

$$P(\delta_k^m(t)) = \delta_{hit}^m I(\delta_k^m(t) = 1), \forall k, m, t, \tag{4}$$

where $$\delta_{hit}^m$$

corresponds to the cache hit rate at edge node m, $m \in M$. Since the MBS may access all the contents in the cloud, $$\delta_{hit}^{MBS} = 1.$$

Regarding queues and loads, the fronthaul load at base station m at time slot t, $$q_{FH}^n(t) \in \mathbb{R}^+$$

denotes the time it will take for base station $m \in M$ to fetch all the queued content requests at time slot $t \in T$. To simplify notations, a fronthaul load $$q_{FH}^0(t)$$

at the MBS is defined, where $$q_{FH}^{MBS}(t) = 0,$$

$t \in T$. Based on CPU load at base stations m, $$q_{CPU}^m(t) \in \mathbb{R}^+$$

denotes the time it takes for the CPU to finish all the backlogged tasks at time slot t. Furthermore, the transmission load of base station m at time slot t, $$q_{tran}^m(t) \in \mathbb{R}^+$$

denotes an estimated the time it takes a base station to finish transmitting all the pending packets and contents to the users at time slot t. The fronthaul, CPU, and transmission load at base station m may also be represented by the queue length of the fronthaul, CPU, and transmission queues, respectively. These notations may be used interchangeable throughout the disclosure.

$$L^m(t) = \max(q_{FH}^m(t), q_{CPU}^m(t), q_{tran}^m(t))$$

is used to estimate the amount of time that a base station m requires to complete all its backlogged tasks at time slot t. $L^m(t)$ is denoted as the load of base station m at time slot t, $m \in M$, $t \in T$.

Regarding the queue dynamics, the tasks located in the fronthaul, and CPU queues may be executed in a first-come first-served (FCFS) manner. Given the fronthaul queue length at t, $$q_{FH}^m(t),$$

and the amount of data edge nodes m required to fetch content for all users K, $$\Delta^{FH}(t) = \sum\nolimits_{k \in K} r_k^{file}(t) I(u^k(t) = n) I(r_k^{stat}(t) = 1)(1 - \delta_n^k(t)),$$

$$q_{FH}^m(t+1)$$

is a deterministic value, where, as in Equation (5).

$$q_{FH}^m(t+1) = \max(q_{FH}^m(t) - 1, 0) + \frac{\Delta_k^{FH}(t)}{f_{FH}^m}, n \in \mathcal{N}. \tag{5}$$

The dynamics of the queue lengths of the CPU queues may be expressed in a similar manner, while the dynamics of the queue lengths of the transmission queues cannot be expressed as a deterministic expression. Given the queue length of the transmission queue at base station m at time slot $$q_{tran}^m(t),$$

and the newly arrived tasks, it is assumed that the $$q_{tran}^m(t+1)$$

is a random variable, following the probability distribution $$P(q_{tran}^m(t+1) \mid r_{tran}^m(t), H),$$

where H corresponds to the combination of the historical and current values of the aforementioned random variables. Due to the inter-dependencies between the fronthaul queue and transmission queue, user requests are not necessarily executed FCFS in the transmission queue.

Figure 4:
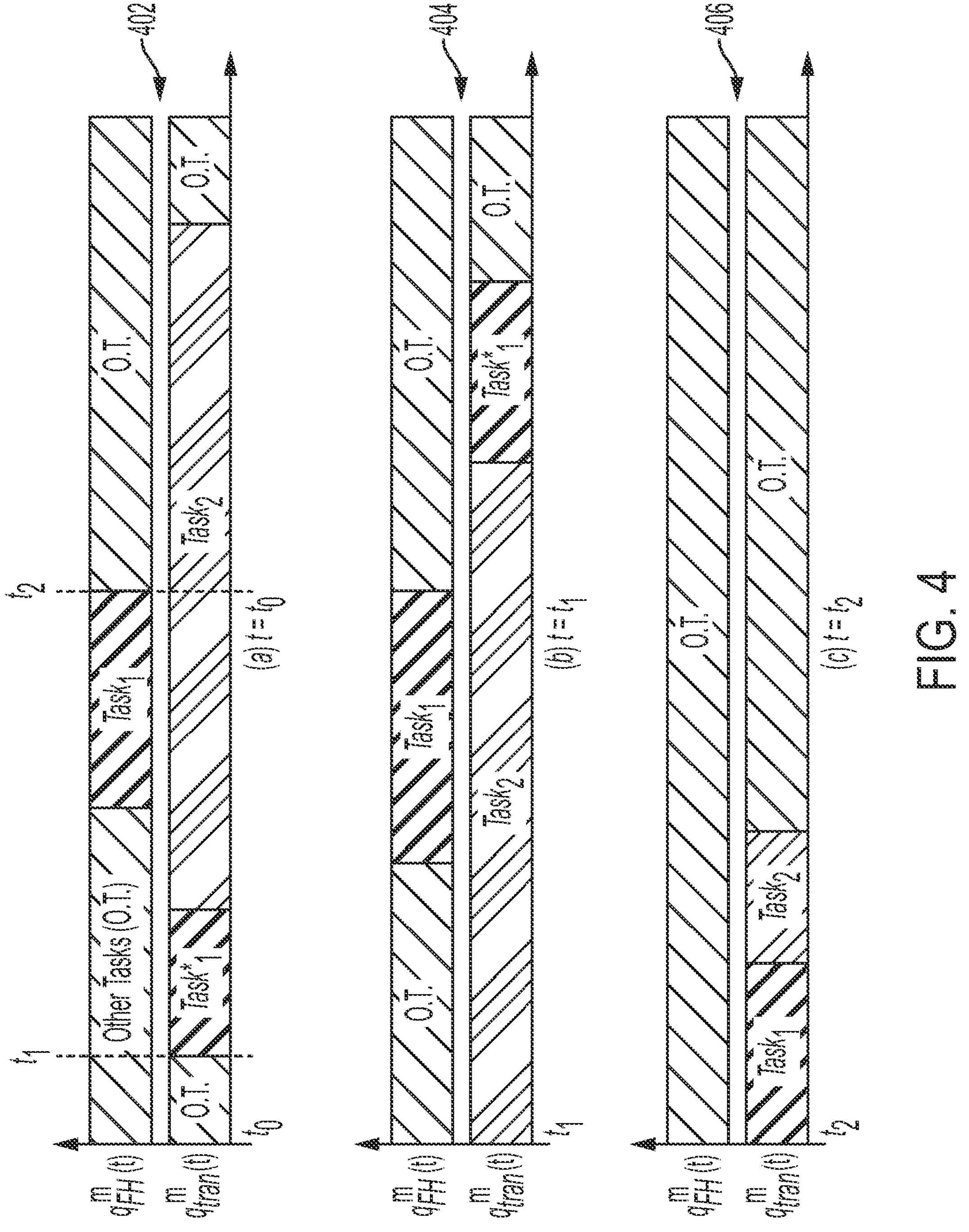
FIG. 4 is a diagram showing example queues, according to an embodiment.

FIG. 4 is a diagram showing example queues, according to an embodiment. In the example shown in FIG. 4, two tasks, $Task_1$ and $Task_2$ may arrive in order. $Task_1$ may require both fetching data from fronthaul and data transmission, while $Task_2$ may only require data transmission. At time $t_1$, as shown in queue 402, when other tasks (O.T.) are completed in the transmission queue, the task at the head-of-line (HoL) is $Task_1$. However, since $Task_1$'s fetching data from fronthaul portion is not completed yet, its transmission portion cannot start immediately. In this case, $Task_2$'s data transmission portion will start first, as shown in queue 404. However, once $Task_1$'s required content is fetched from the MBS, the execution of $Task_2$ will pause to first serve $Task_1$ preemptively, as shown in queue 406.

At the beginning of time slot $t \in T$, each base station $m \in M$ may share, through broadcasting on the control channel, the load of all its fronthaul, CPU, and transmission queues. The load status of all the base stations in a vector, as in Equation (6).

$$q(t) = (q_{CPU}^{MBS}, q_{FH}^{tran}, q_{FH}^{1}, q_{CPU}^{1}, q_{tran}^{1}, \ldots, q_{FH}^{N}, q_{CPU}^{N}, q_{tran}^{N}), t \in T \tag{6}$$

Figure 5:
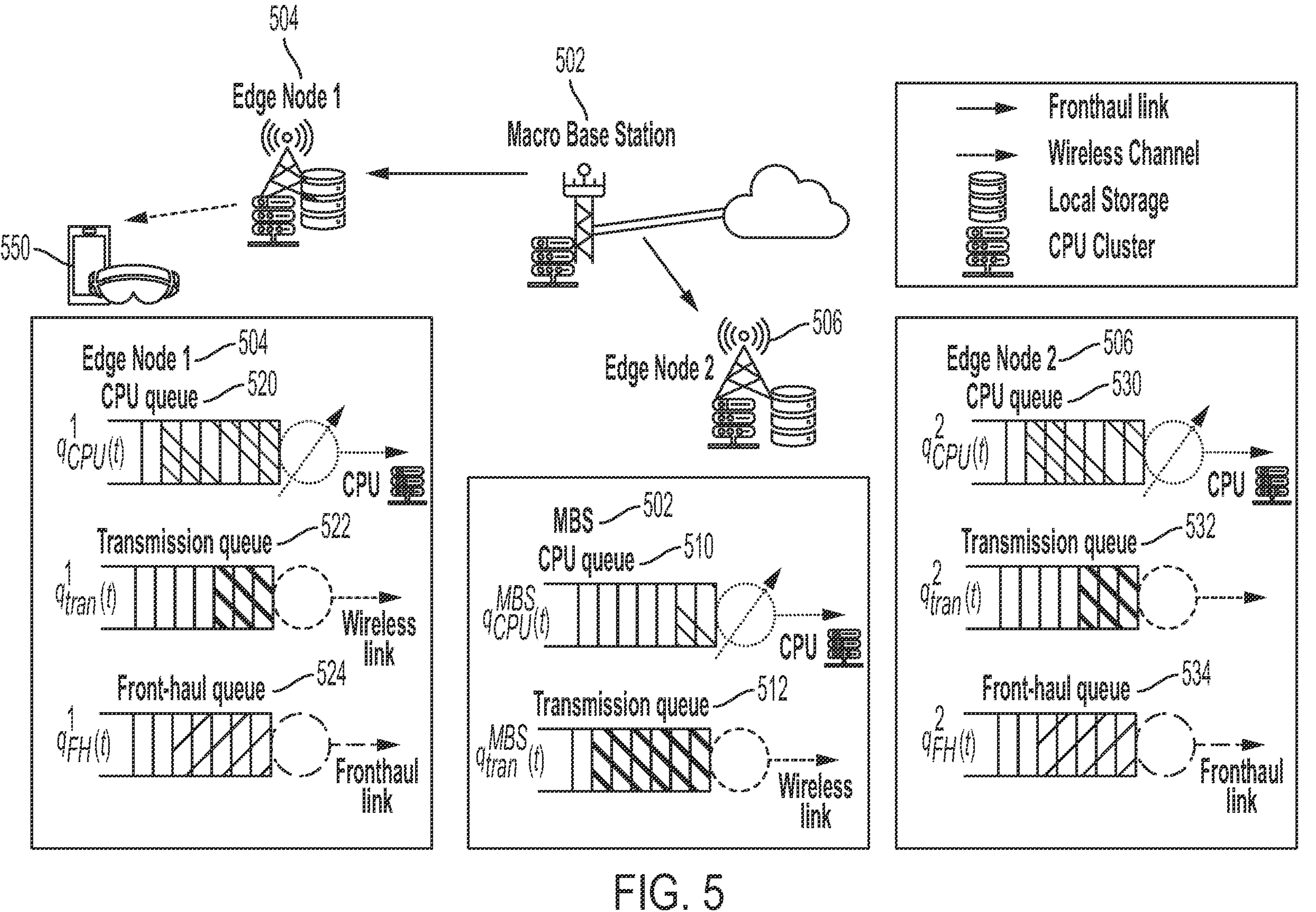
FIG. 5 is a diagram of a communication, computing, and caching (3C)-enabled mobile edge computing (MEC), according to an embodiment.

FIG. 5 is a diagram of a 3C-enabled MEC network, according to an embodiment. The network may include one MBS 502, a first edge node 504 and a second edge node 506. The number of MBS and edge nodes depicted in FIG. 5 is exemplary and not exclusive, as the network may include any number of MBS and edge nodes. The MBS 502 may include a CPU queue 510 and a transmission queue 512. Although the MBS 502 is depicted to be connected to a cloud storage and to not include a local storage, the MBS 502 may include a local storage. The first edge node 504 may include a CPU queue 520, a transmission queue 522 and a fronthaul queue 524. The second edge node 506 may include a CPU queue 530, a transmission queue 532 and a fronthaul queue 534. A user of a user device 550 may be connected with the network and request a computational task, such as a VR video processing task, and, as is disclosed herein, the system may determine which edge node to perform the computational task, or at least a part of the computational task, based on the queues of the MBS 502, the first edge node 504 and the second edge node 506, as well as based on data collected for each user device (e.g., a mobile device) connected to the network.

The joint load balancing system may distribute the 3C load in the MEC networks evenly among the base stations, which is equivalent to minimizing the load in the base station that is the most loaded. The maximum load among all the fronthauls, CPUs, and wireless link, is defined as the maximum load L(t) in the network, as in Equation (7).

$$L(t) = \max_{m \in M} L^m(t). \tag{7}$$

The system may minimize the time-averaged maximum load in an MEC network as a Markov Decision Process (MDP), and an example of the system based on MARL is also disclosed herein.

To alleviate the signaling overhead and large state and action space of centralized scheduling algorithm, the system may implement a decentralized user association framework. At the beginning of the each time slot $t \in T$, the association decision for user $k \in K$ is made based on the current load status of the MEC network, q(t), and the user's request $$r_k(t) = (h_k(t), r_k^{stat}(t), r_k^{size}(t), \delta_k(t)).$$

The decision-making module for each user may be defined as an agent, which may either be located on the user device, or in the decision-making module of the MEC network. Hence, in the decentralized user scheduling framework, a set of N={1, . . . , N} agents cooperatively attempt to minimize the cost, which corresponds to the time-averaged maximum load in the system.

The joint load balancing may be formulated as a decentralized partially observable MDP (Dec-POMDP) problem. That is, the system (e.g., the policy) may make decisions using limited information. The system may know the queue status and the request that is about to be sent from the mobile device, but it may not know the requests that other devices are sending. Hence, the system state is only "partially observable". The full set of system states may be denoted as s(t), and only a subset of this is in o(t). The function $Z_i$ specifies the mapping from s(t) to the observation $o_i(t)$ that is available to the i-th mobile device. The control policy may be viewed as a neural network model that takes the observation as inputs and will output the control action.

"Decentralized" may indicate that the policy is meant to be run in a decentralized manner during deployment. Thus, each mobile device may run its own copy of the policy, which only uses observations available to the mobile device on which the policy is running. To obtain this policy, however, the system may utilize a centralized training procedure, where the interaction experiences gathered by all policies on their respective devices are aggregated. After the policy is trained, this same policy may then be deployed to all mobile devices. The Dec-POMDP may be a model for coordination and decision-making among multiple agents. Dec-POMDP may be a generalization of a Markov decision process (MDP) and a partially observable Markov decision process (POMDP) to consider multiple decentralized agents.

For the decision epoch and discount factor, the system may use each discrete time slot as a decision epoch for the formulated Dec-POMDP problem, hence the set of decision epochs may be represented as T. A discount cost scenario with discount factor $\gamma$ may be considered.

For the states, in decision epoch $t \in T$, the state of the Dec-POMDP is the concatenation of all the queues in the network and information about the new requests from users, as shown in Equation (8).

$$s(t) = (q(t), r_1(t), \ldots, r_K(t)) \in \mathcal{S}. \tag{8}$$

Regarding the observations, in decision epoch $t \in T$, the observation of agent $k \in K$ may be chosen as in Equation (9):

$$o_k(t) = (q(t), r_k(t)) \in \mathcal{O}, \forall k, t \tag{9}$$

with $Z_k(\cdot)$: S→O denoting the function that maps state of the network s(t) to the observation $o_k(t)$ of agent $n \in N$.

For actions, in decision epoch $t \in T$, agent k may select the association action $u_k(t) \in M$ for user k. The joint action in decision epoch t may be as in Equation (10).

$$u(t) = (u_1(t), \ldots, u_K(t)) \in \mathcal{M}^K, t \in \mathcal{T} \tag{10}$$

Regarding the cost, at time slot t, the cost may correspond to the maximum load in the MEC network, where, as in Equation (11).

$$c(s(t), u(t)) = L(t). \quad (11)$$

For the policy, a control policy agent $k \in K$, $\pi_k(\cdot)$: $O \rightarrow M$, may map the observation $o_k(t)$ of agent k to an association action $u_k(t)$.

Regarding the state transition probability, the joint state transition probability of the Dec-POMDP problem depends on the probability distribution of the random variables in the system, where $P=P(s_{t+1}|s_t,u(t))$. The Dec-POMDP problem may be described as an 8-tuple, as in Equation (12).

$$D = (\mathcal{K}, \mathcal{S}, \mathcal{M}, P, c(\cdot), \gamma, \mathcal{O}, Z_1(\cdot) \times \ldots \times Z_K(\cdot)) \quad (12)$$

For the optimal decentralized policy, the joint load balancing problem finds the optimal stationary decentralized policy $\pi=(\pi_1, \ldots, \pi_k)$, where, as in Equation (13).

$$\pi = \underset{\pi}{\operatorname{argmin}} \sum_{t=1}^{T} \gamma^t E[c(s(t), \pi_1(o_1(t)), \ldots, \pi_K(o_K(t)))] \quad (13)$$

A parameter sharing-based MARL framework may be adopted, under which all the agents share the same policy parameters $\theta$ and value function parameters $\phi$. The system provides good training efficiency when the agents in the system are homogenous, which is the case for the agents in the above formulated Dec-POMDP problem. $\pi_\theta \hat{o}_k(t)$ denotes the policy parameterize by parameters $\theta$ and $v_\phi(\hat{o}_k(t))$ denotes the value function parameterized by parameters $\phi$. The index of each agent is appended into the observation space, where $\hat{o}_k(t)=(o_k(t),k)$, $k \in K$, to ensure that different agents may adopt different actions under the same observation.

In the parameter sharing-based MARL system, centralized training and decentralized execution may be adopted, and many single agent DRL methods may be selected to update the policy network. Disclosed herein is proximal policy optimization (PPO) method, due to its robustness and simplicity. In Table 1 (referred to as Algorithm 1 herein), an example of the MARL algorithm that combines parameter sharing and PPO (PS-PPO) is shown as follows.

TABLE 1

| Algorithm 1 PS-PPO-based Joint Load Balancing Algorithm | |
|---|---|
| 1: | Input: Initial policy network parameters $\theta_0$ and value network parameters $\phi_0$ |
| 2: | for i = 0, . . . , $N_{iter}$ do |
| 3: | for $k \in \mathcal{K}$ do |
| 4: | Collect set of J trajectories using $\pi_{\theta_i}(u_k(t)|\hat{o}_k(t))$ |
| 5: | Estimate the advantage function $A_{\theta_i}(\hat{o}_k^j(t), u_k^j(t))$ |
| 6: | end for |
| 7: | Update policy network parameter $\theta$ by (10) |
| 8: | Update value network parameter $\phi$ by (12) |
| 9: | end for |

According to Algorithm 1, the system may first initialize the policy network parameters $\theta_0$ and value network parameters $\phi_0$. Afterwards, at iteration i, all agents may jointly rollout J trajectories, $$\{\tau_k^1, \ldots, \tau_k^J\}, \text{ where } \tau_k^j = \{s^j(1), u^j(1), \ldots, s^j(T), u^j(T)\}$$

for T time steps using policy $\pi_{\theta_i}(u_k(t)|\hat{o}_k(t))$. Then, the advantage function for each time step $A_\theta(\hat{o}_k(t),u_k(t))$ may be estimated by taking the difference of the cost-to-go function $$\hat{C}_k^J(t) = \frac{1}{K} \sum_{m=t+1}^{T} c(s^j(t), u^j(t))$$

and the value function $v_{\phi_i}(\hat{o}_k(t))$. Then, the policy network parameters may be updated by jointly optimizing the PPO-Clip objective for all agents, as in Equation (14):

$$\theta_{i+1} = \underset{\theta}{\operatorname{argmin}} \sum_{k=1}^{K} \sum_{j=1}^{J} \sum_{t=1}^{T} \min\left( \frac{\pi_\theta(u_k^j(t) \mid \hat{o}_k^j(t))}{\pi_{\theta_i}(u_k^j(t) \mid \hat{o}_k^j(t))} A_{\theta_i}(\hat{o}_k^j(t), u_k^j(t)), g(\epsilon, A_{\theta_i}(\hat{o}_k^j(t), u_k^j(t)))\right)^2, \quad (14)$$

where, as in Equation (15).

$$g(\epsilon, A) = \begin{cases} (1+\epsilon)A, & \text{if } A \geq 0 \\ (1-\epsilon)A, & \text{if } A < 0 \end{cases}. \quad (15)$$

The value network parameters may be updated, as in Equation (16).

$$\phi_{i+1} = \arg\max_{\phi} \sum_{k=1}^{K} \sum_{j=1}^{J} \sum_{t=1}^{T} \left(v_\phi(\hat{o}_k^j(t)) - \hat{C}_k^j(t)\right)^2 \quad (16)$$

Thus, to determine which base station to connect to, the system may utilize the policy that includes at least two inputs: the status of all the base stations' queues (transmission and computation queues, denoted altogether as q(t)), and the request the mobile device is about to send (denoted as r(t)). These two factors taken together are called an observation (denoted as o). The policy $\pi(o(t))$ receives an observation as input and outputs an action. Actions are denoted as u(t), and indicate which base station the mobile device should connect to for the request it is about to send. After an action is taken, a reward is received. This reward is denoted as c(s(t),u(t)), and the reward guides the learning process.

In Equations (14) and (16), the summation $$\sum_{k=1}^{K}$$

. . . sums over all mobile devices. By introducing the additional sum, the system may estimate the policy parameters by aggregating the data collected across all mobile devices. Thus, for each learning agent, the system has a policy network and a value network.

The system may aggregate the interaction experiences collected by all the mobile devices into a common rollout buffer, which may be used to train the control policy. The value function and advantage function are functions that are estimated as part of the internal process of PPO. A trajectory may refer to a sequence of states, actions and reward pairs. As a policy is continuously interacting with the environment, a sequence of states is generated. For example, a sequence of states may be generated based on the continuous interaction of an existing policy (or new policy) of a mobile device with a wireless network (e.g., an MEC network). The policy may be a program that is running on a particular mobile device, and all policies may be run for each device on a central server.

Figure 6:
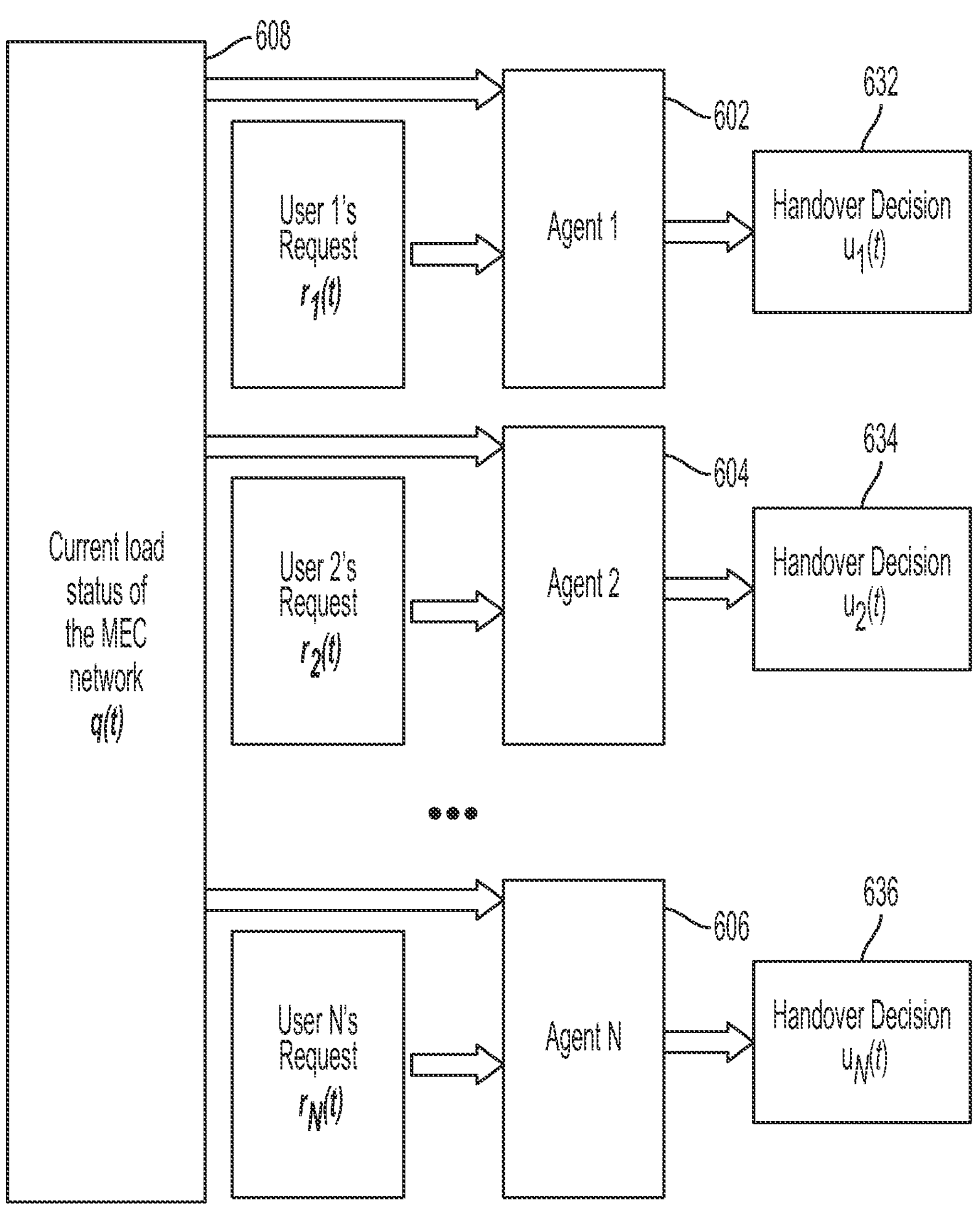
FIG. 6 is a diagram of a process for decentralized load balancing, according to an embodiment.

FIG. 6 is a diagram of a process for decentralized load balancing, according to an embodiment. The system may include a first agent 602, a second agent 604 and a third agent 606 (e.g., a base station and/or edge node). It is noted that the disclosed systems are not limited to three agents only, and those of ordinary skill in the art will understand that fewer or more agents may be utilized. Each of the agents 602-606 receives (or is configured to retrieve) a current load status 608 of the MEC network (i.e., q(t) of Equation (6)). Each agent 602-606 may receive a corresponding user request (i.e., user 1's request to user N's request) for a computation task, and then, based on the policy either run at the user devices, the agents, and/or a centralized server, the agents 602-606 may produce corresponding handover decisions 632-636 for each of the user requests.

Figure 7:
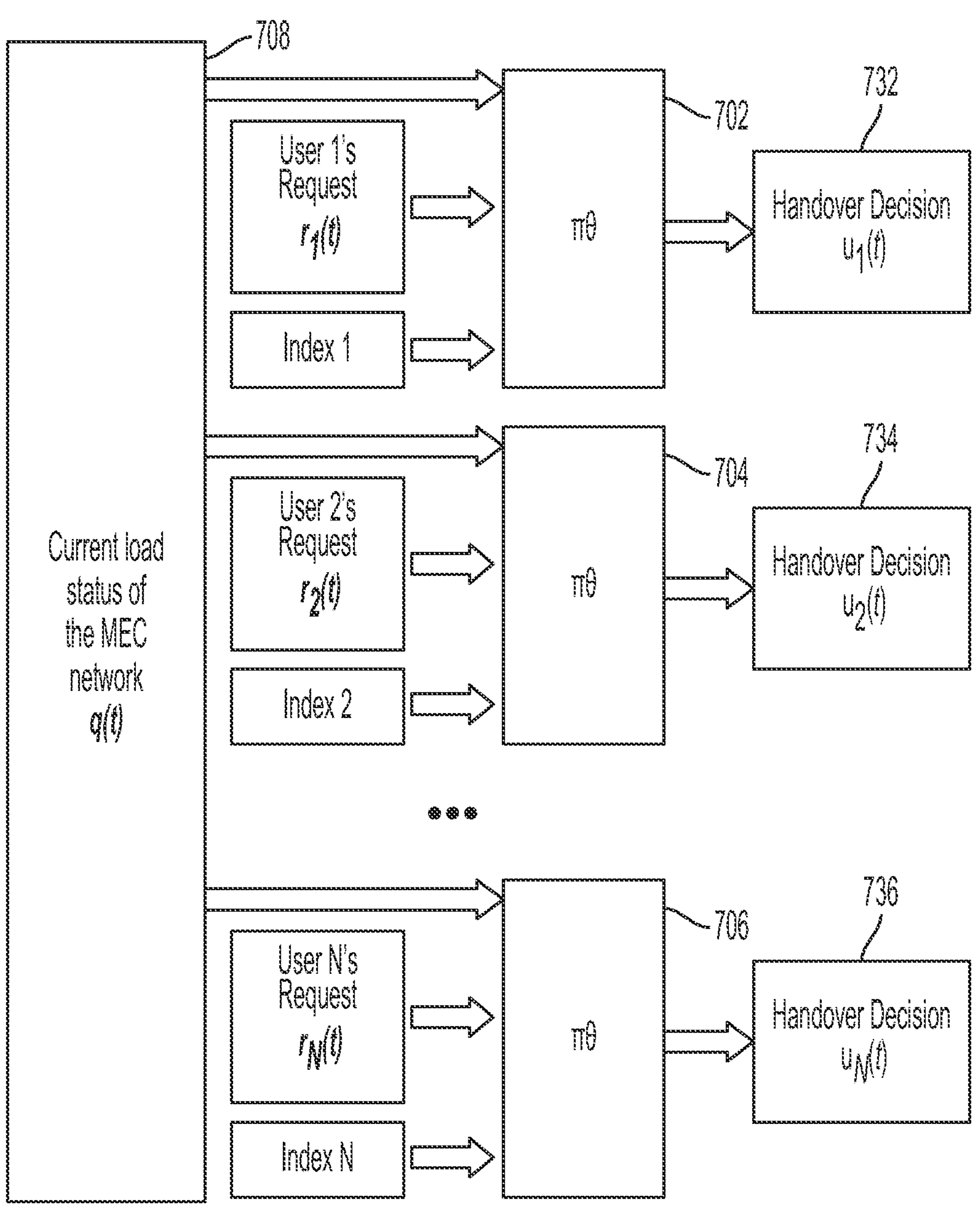
FIG. 7 is a diagram of a process for parameter sharing-based multi-agent deep reinforcement learning (DRL)-based (MARL) load balancing, according to an embodiment.

FIG. 7 is a diagram of a process for parameter sharing-based MARL load balancing, according to an embodiment. The system may include a first agent 702, a second agent 704 and a third agent 706 (e.g., a base station and/or edge node). Each of the agents may share a policy $\pi_\theta$ used to determine a handover decision based on user requests (i.e., user 1's request to user N's request) and the current load status 708 of the MEC network. Each agent may also receive an index (e.g., indexes 1-3) along with the user requests for a computational task for generating the corresponding handover decisions 732-736. The index may be an arbitrary unique number corresponding to the agent, which may help the policy to capture different behaviors for different agents. The index may correspond to the type of agent, such as different device types, different types of learnable user behaviors, different request types, etc., and/or a combination thereof.

Figure 8:
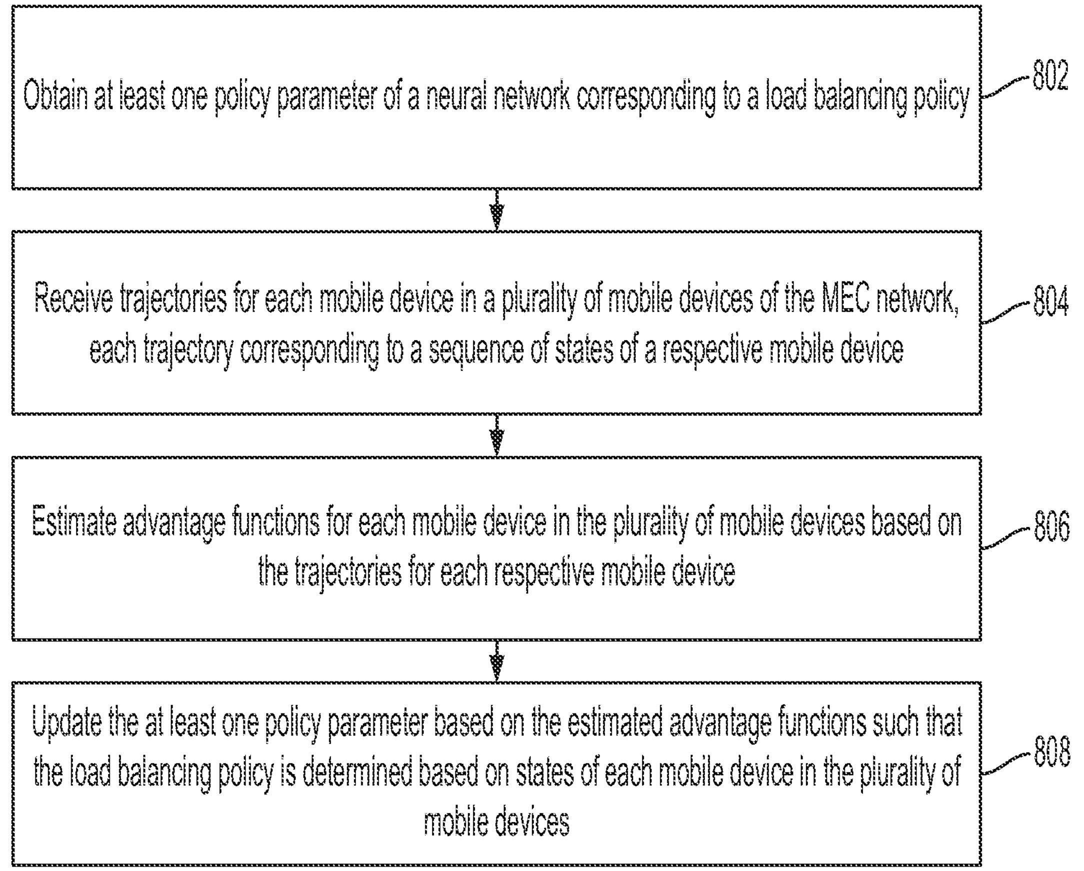
FIG. 8 is a flowchart for a method for training a neural network for load balancing in an MEC network, according to an embodiment.

FIG. 8 is a flowchart for a method for training a neural network for load balancing in an MEC network, according to an embodiment. In operation 802, the system may obtain at least one policy parameter of a neural network corresponding to a load balancing policy. In operation 804, the system may receive trajectories for each mobile device in a plurality of mobile devices of the MEC network, each trajectory corresponding to a sequence of states of a respective mobile device. In operation 806, the system may estimate advantage functions for each mobile device in the plurality of mobile devices based on the trajectories for each respective mobile device. In operation 808, the system may update the at least one policy parameter based on the estimated advantage functions such that the load balancing policy is determined based on states of each mobile device in the plurality of mobile devices.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

obtaining at least one policy parameter of a neural network corresponding to a load balancing policy;

receiving trajectories for each mobile device in a plurality of mobile devices of the wireless network, each trajectory corresponding to a sequence of states, actions and rewards for the actions of a respective mobile device, wherein the sequence of states is generated based on a continuous interaction of an existing policy of the respective mobile device with the wireless network, the actions indicating a base station to which the mobile device should connect for a request and the rewards being received after the actions guide a learning process;

estimating advantage functions for each mobile device in the plurality of mobile devices based on the trajectories for each respective mobile device; and updating the at least one policy parameter based on the estimated advantage functions such that the load balancing policy is determined based on states of each mobile device in the plurality of mobile devices, wherein the advantage functions are determined based on a difference between a cost-to-go function and a value function, and wherein the sequence of states of each trajectory corresponds to states over a predetermined number of time steps for each mobile device of the plurality of mobile devices.

2. The method of claim 1, further comprising:

obtaining at least one value parameter of the neural network corresponding to the load balancing policy; and updating the at least one value parameter based on the estimated advantage functions.

3. The method of claim 1, further comprising deploying the neural network corresponding to the load balancing policy to each mobile device of the plurality of mobile devices in the wireless network.

4. The method of claim 1, further comprising:

receiving, as a first input to the neural network corresponding to the load balancing policy, statuses of queues of each base station of a plurality of base stations in the wireless network; and receiving, as a second input to the neural network corresponding to the load balancing policy, a task request from a first mobile device of the plurality of mobile devices.

5. The method of claim 4, further comprising determining a base station of the plurality of base stations for performing the requested task based on the first input and the second input, and performing a handover operation connecting the first mobile device to the determined base station for performing the requested task.

6. The method of claim 1, wherein the wireless network comprising a mobile edge computing (MEC) network.

7. A system comprising:

a memory storing instructions; and a processor configured to execute the instructions to:

obtain at least one policy parameter of a neural network corresponding to a load balancing policy;

receive trajectories for each mobile device in a plurality of mobile devices of a mobile edge computing (MEC) network, each trajectory corresponding to a sequence of states, actions and rewards for the actions of a respective mobile device, the actions indicating a base station to which the mobile device should connect for a request and the rewards being received after the actions guide a learning process, wherein the sequence of states is generated based on a continuous interaction of an existing policy of the respective mobile device with the MEC network;

estimate advantage functions for each mobile device in the plurality of mobile devices based on the trajectories for each respective mobile device; and update the at least one policy parameter based on the estimated advantage functions such that the load balancing policy is determined based on states of each mobile device in the plurality of mobile devices, wherein the advantage functions are determined based on a difference between a cost-to-go function and a value function, and wherein the sequence of states of each trajectory corresponds to states over a predetermined number of time steps for each mobile device of the plurality of mobile devices.

8. The system of claim 7, wherein the processor is further configured to execute the instructions to:

obtain at least one value parameter of the neural network corresponding to the load balancing policy; and update the at least one value parameter based on the estimated advantage functions.

9. The system of claim 7, wherein the processor is further configured to execute the instructions to deploy the neural network corresponding to the load balancing policy to each mobile device of the plurality of mobile devices in the MEC network.

10. The system of claim 7, wherein the processor is further configured to execute the instructions to:

receive, as a first input to the neural network corresponding to the load balancing policy, statuses of queues of each base station of a plurality of base stations in the MEC network; and receive, as a second input to the neural network corresponding to the load balancing policy, a task request from a first mobile device of the plurality of mobile devices.

11. The system of claim 10, wherein the processor is further configured to execute the instructions to determine a base station of the plurality of base stations for performing the requested task based on the first input and the second input, and perform a handover operation connecting the first mobile device to the determined base station for performing the requested task.

12. The system of claim 11, wherein the base station for performing the requested task with the first mobile device is determined at the first mobile device.

13. A non-transitory computer-readable storage medium storing instructions that, when executed, cause at least one processor to:

obtain at least one policy parameter of a neural network corresponding to a load balancing policy;

receive trajectories for each mobile device in a plurality of mobile devices of a mobile edge computing (MEC) network, each trajectory corresponding to a sequence of states, actions and rewards for the actions of a respective mobile device, the actions indicating a base station to which the mobile device should connect for a request and the rewards being received after the actions guide a learning process, wherein the sequence of states is generated based on a continuous interaction of an existing policy of the respective mobile device with the MEC network;

estimate advantage functions for each mobile device in the plurality of mobile devices based on the trajectories for each respective mobile device; and update the at least one policy parameter based on the estimated advantage functions such that the load balancing policy is determined based on states of each mobile device in the plurality of mobile devices, wherein the advantage functions are determined based on a difference between a cost-to-go function and a value function, and wherein the sequence of states of each trajectory corresponds to states over a predetermined number of time steps for each mobile device of the plurality of mobile devices.

14. The storage medium of claim 13, wherein the instructions, when executed, further cause the at least one processor to:

obtain at least one value parameter of the neural network corresponding to the load balancing policy; and update the at least one value parameter based on the estimated advantage functions.

15. The storage medium of claim 13, wherein the instructions, when executed, further cause the at least one processor to deploy the neural network corresponding to the load balancing policy to each mobile device of the plurality of mobile devices in the MEC network.

* * * * *